United States Patent
Harrenstien et al.

(10) Patent No.: US 7,774,633 B1
(45) Date of Patent: Aug. 10, 2010

(54) CONTROLLED POWER CYCLING IN COMPUTING DEVICES

(75) Inventors: Kenneth L. Harrenstien, Palo Alto, CA (US); Ross Biro, Ashburn, VA (US)

(73) Assignee: Google Inc., Mountain View, CA (US)

( * ) Notice: Subject to any disclaimer, the term of this patent is extended or adjusted under 35 U.S.C. 154(b) by 545 days.

(21) Appl. No.: 11/614,865

(22) Filed: Dec. 21, 2006

(51) Int. Cl.
*G06F 1/26* (2006.01)
(52) U.S. Cl. .................. 713/323; 713/300; 713/310; 713/324
(58) Field of Classification Search ........... 713/300, 713/323
See application file for complete search history.

(56) References Cited

U.S. PATENT DOCUMENTS

| | | | | |
|---|---|---|---|---|
| 4,611,289 | A * | 9/1986 | Coppola | 713/300 |
| 4,673,824 | A * | 6/1987 | Pepper | 307/64 |
| 5,742,514 | A * | 4/1998 | Bonola | 700/286 |
| 6,507,273 | B1 * | 1/2003 | Chang et al. | 340/3.1 |
| 6,920,573 | B2 * | 7/2005 | Lee | 713/323 |
| 7,099,934 | B1 * | 8/2006 | Ewing et al. | 709/223 |
| 2005/0081074 | A1 * | 4/2005 | Chheda et al. | 713/320 |
| 2008/0024099 | A1 * | 1/2008 | Oki et al. | 323/282 |

OTHER PUBLICATIONS

*ATX Specification*, Version 2.2, Intel Corporation, 2003-2004, 26 pages.
*ATX/ATX12V Power Supply Design Guide*, Version 1.1, Intel Corporation, 2000, 34 pages.
*Information for On-site Server Admins*, Servprise International, Inc., 2005, 3 pages.
*WebReboot Product Description*, Servprise International, Inc., 2005, 2 pages.
Comparison chart of the WebReboot and competing reboot products, Servprise International, Inc., 2005, 1 page.
*Intel N440BX Server Board Wake On LAN*, Intel Corporation, Server Products, Aug. 17, 2004, http://www.intel.com/support/motherboards/server/n440bx/sb/cs-014908.htm.

* cited by examiner

*Primary Examiner*—Nitin C Patel
(74) *Attorney, Agent, or Firm*—Fish & Richardson P.C.

(57) ABSTRACT

Cycling power in a computer to clear hang-up conditions may include disabling low voltage DC signals between an output of a standby DC power supply and standby-powered circuits in response to a power cycle request. In response to a disable signal, a power cycle module (PCM) may disable standby power being supplied to standby circuits in a computer, server, or router, for example. In addition, the PCM may disable power to main circuits by, for example, generating logic-level control signals to the power supply, or by opening a series-connected switch through which main current flows. In response to a re-enable signal, the PCM may re-enable the supply of standby and/or main power to a computer.

27 Claims, 6 Drawing Sheets

CONTROLLED POWER CYCLING IN COMPUTING DEVICES

TECHNICAL FIELD

The following disclosure relates to cycling power supplied in computer systems.

BACKGROUND

Computers have become widely adopted for various applications, for both personal and corporate use. The wide user base includes many users who rely on information technology (IT) support services, typically referred to as customer support or a "help desk."

Available resources for IT support services are often limited. Nevertheless, as users take advantage of networking and mobile computing capabilities, requests for IT support services can come from users physically located either in nearby or distant locations. In general, computer networks include an information channel (e.g., Ethernet, RS-232, or wireless local area networks) through which two or more computers can communicate messages. The ability to connect to a network from a wireless laptop or handheld computing device enables users to remotely communicate with other computers from across a desk or from a different continent.

One type of problem that can involve IT support services is often referred to as a computer "hang-up." Hang-ups generally refer to a condition in which a program (either an application or part of the operating system) stops performing its expected function and also stops responding to other parts of the system. Often the offending program may simply appear to freeze. A computer hang-up may result from any number of error conditions that can occur in the central processing unit (CPU) or associated support device, such as a network interface adapter, for example. Hang-ups can originate, for example, from defective or mismatched components, electrostatic discharge, bugs in drivers or other software, memory fragmentation, software component loading errors, or a combination of these or other sources.

SUMMARY

Cycling power in a computer to clear hang-up conditions may include disabling low voltage DC signals between an output of a standby DC power supply and standby-powered circuits in response to a power cycle request. In response to a disable signal, a power cycle module (PCM) may disable standby power being supplied to standby circuits in a computer, server, or router, for example. In addition, the PCM may disable power to main circuits by, for example, generating logic-level control signals to the power supply, or by opening a series-connected switch through which main current flows. In response to a re-enable signal, the PCM may re-enable the supply of standby and/or main power to a computer. In an exemplary embodiment, a PCM responsive to power cycle request messages controls power supplied by an industry standard ATX-compliant power supply to a motherboard.

In various embodiments, the disable/re-enable signals may be triggered by a combination of conditions, such as receiving a signal encoded as a valid Ethernet signal, or as an out-of-band signal, which may be an invalid Ethernet signal. The signal may be received through a serial port, such as a SMBus, I2C bus, or 1-wire serial connection.

In one embodiment, absence of an expected signal may trigger a power cycle operation. Trigger signals may also be generated, for example, when more than a predetermined number of rings occur on a phone line (e.g., host does not answer), when a network carrier is not available (e.g., indicating the network is down), or when the network becomes available after a period of interrupted service. The signal may be generated based on timers or according to a selected schedule. Triggering signals may be generated internally or externally, and may be transmitted to the PCM over wired and/or wireless interfaces. In various embodiments, the PCM may receive power from the standby power supply, the main power supply, an external power supply, an auxiliary power source, a battery, an interface that receives the disable/re-enable signals, or a combination of any of these through a power combiner circuit such as a diode-OR circuit.

In various embodiments, the PCM may switch one or more voltages between the power supply and the main and/or standby circuits, and/or at least one return line (e.g., circuit ground reference).

Some embodiments may provide one or more advantages. For example, remote power cycling may resolve certain problems with computing devices that are "hung up" in a condition that a re-boot operation of main power only will not resolve. Remote power cycling may be relatively inexpensive to implement, and further may operate by switching low voltage DC signals in ways that substantially reduce or eliminate AC-side power surges and simplify obtaining safety agency (e.g., Underwriter Laboratories) certification or approval for a product or computing system. Transistors or other switching devices for low voltage DC (e.g., 1, 3, 5, 12 Volts) typically involve a lower total implementation cost than AC side switches. Some embodiments receive power and/or commands to selectively disable standby power and/or main power. Power cycle commands may be flexibly incorporated into a variety of messaging formats such as out-of-band signals in Ethernet frames, for example.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Some computer hang-up conditions can be cleared by re-booting a computer. Re-booting a computer typically involves disabling main power to circuits in the computer, such as the CPU (central processing unit) on a motherboard. During a re-boot operation, standby power is typically not disabled. One typical re-boot procedure to clear a hang-up condition involves disabling main power in response to pressing and holding a power switch for about 3 seconds. Main power can subsequently be restored to the computer by again pressing the power switch. Some commercial systems allow IT support services to re-boot a computer from a remote location.

In some systems, one or more support circuits or devices (e.g., network interface circuits, mass storage devices) in the computer may continue to operate from the standby power that is not disabled during a re-boot. If the hang-up in the computer originates in a standby-powered circuit, a power cycle may be required to clear the hang-up. A power cycle typically involves disabling a supply of substantially all DC (e.g., 5V, 12V) power, including both main power and standby power, to a CPU (e.g., on a motherboard) and associated support circuits or devices in the computer. Some commercial systems provide a capability to power cycle a computer from a remote location by disabling an AC (e.g., 120 Volts, 60 Hz) input signal to a power supply in the computer.

Figure 1A:
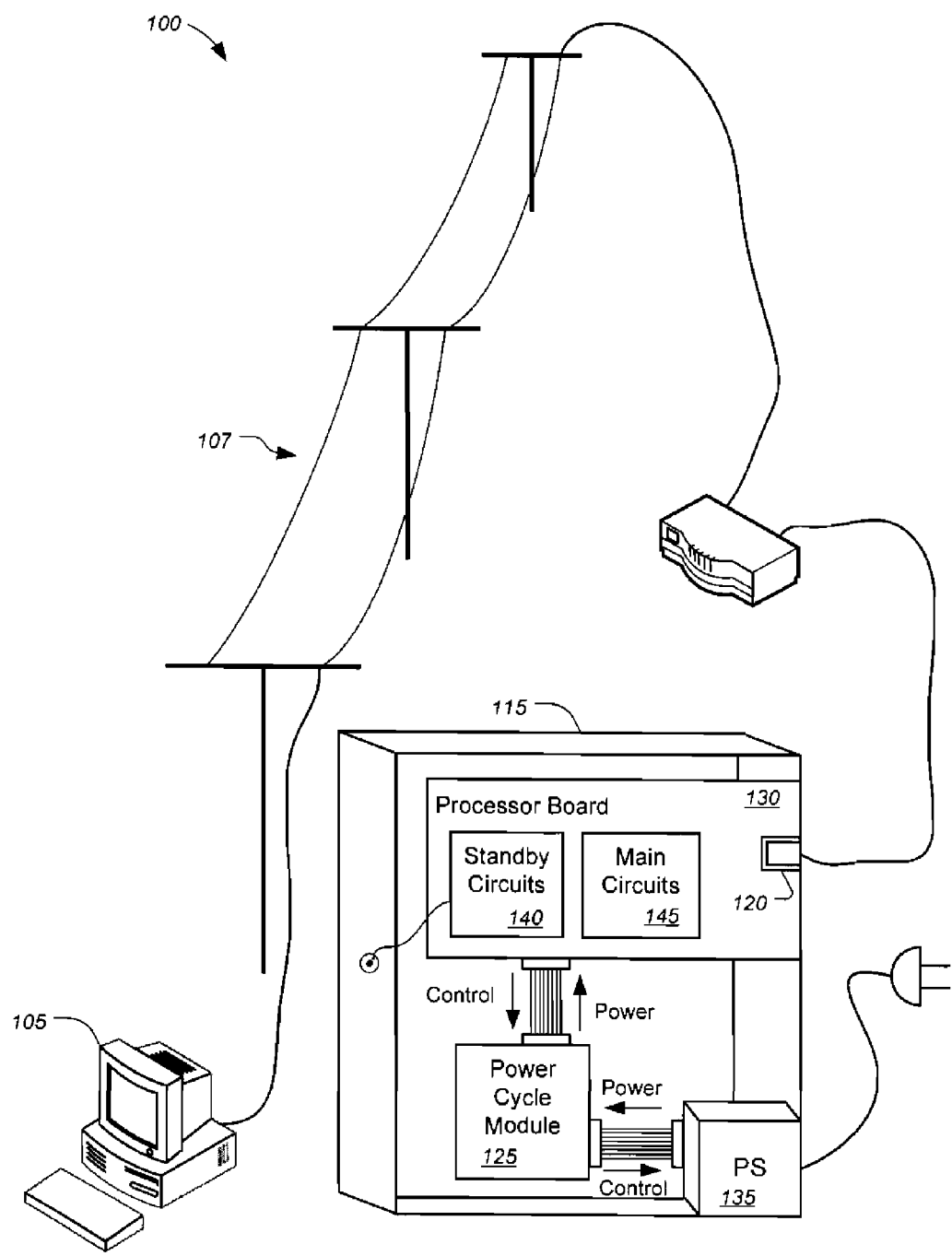
FIGS. 1A-1B are diagrams showing example systems with computers capable of being remotely power cycled by disabling low voltage DC standby power signals.
Figure 1B:
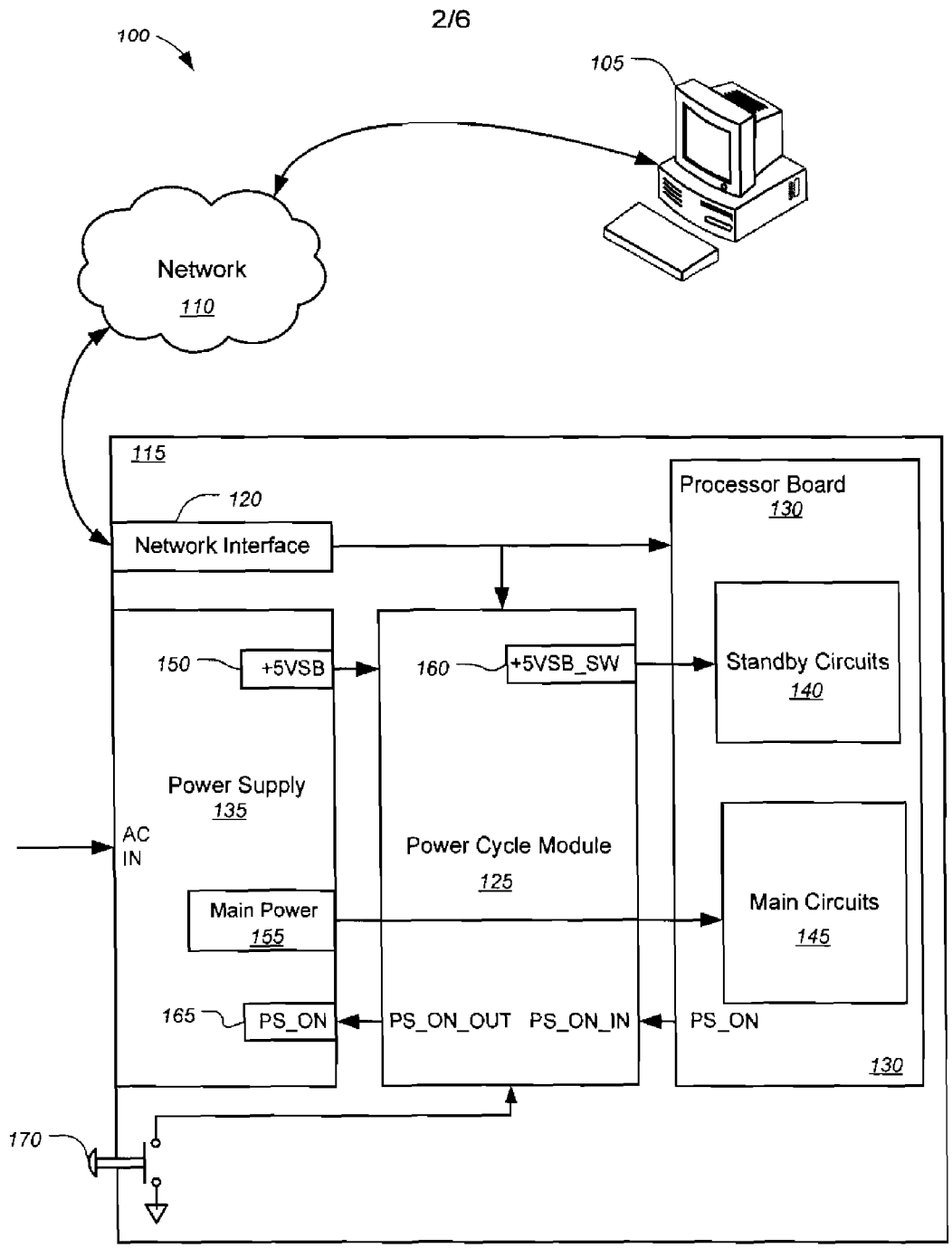

FIGS. 1A-1B are diagrams showing example systems with computers capable of being remotely power cycled by disabling low voltage DC standby power signals. Depicted are embodiments of an exemplary computer system 100 capable of cycling power supplied (1) to circuits that are powered by main power and (2) to circuits that are powered by standby power.

In some embodiments, power cycling occurs in response to a remotely generated command. In various examples, a remotely generated command may be generated by an electronic processor, transmitted over an electronic information channel, and received by the computer system 100. Remotely generated commands may be generated at any appropriate location external to the computer being power cycled. The commands may be transmitted as encoded propagating electromagnetic signals that may propagate along a conductor, as an optical signal, and/or as a wireless (e.g., radio frequency) signal. Responsive to the received command, the computer system 100 is configured to disable and/or re-enable power to main and/or standby circuits, for example, to clear an improper operating condition (e.g., a hang up) in the computer system 100.

As shown in FIG. 1A, the system 100 includes a remote user terminal 105, a transmission line 107, and a target device 115. The remote user terminal 105 is connected to the target device 115 through the transmission line 107. The transmission line 107 transports a power cycle request (PCR) message from the remote user terminal 105 to a network interface 120 on the target device 115. The PCR message can cause the target device 115 to perform power cycle operations, as discussed in additional detail below. In some embodiments, power cycling the target device 115 involves disabling main power and standby power in the target device 115.

Power cycling may be accomplished remotely by sending a PCR message to the target device 115 via an electronic communication network. By way of illustrative examples and not limitation, an electronic communication network may include one or more information channels, such as digital cellular (e.g., CDMA, GSM), analog cellular (AMPS), satellite, digital subscriber line (xDSL), cable television, plain old telephone system (POTS), the Internet, and/or various networks, including metropolitan area networks, wide area networks, virtual private networks, and/or local area networks, for example.

Remote power cycling may also be performed by the remote user terminal 105 while in close physical proximity to the target device 115 if, for example, the terminal 105 generates and sends a PCR message to the target device 115 over an electronic communication channel. The message may be sent, for example, directly through a communication channel such as an infrared link, serial or parallel interface (e.g., universal serial bus (USB), Firewire), or short range wireless (e.g., Bluetooth) communication antenna (not shown in FIG. 1A).

The target device 115 includes a power cycle module (PCM) 125, a processor board 130, and a power supply 135. The processor board 130 includes standby circuits 140 and main circuits 145.

In various embodiments, the standby circuits 140 may include some or all of a network interface controller (NIC) that can execute functions such as wake on LAN and/or other remote management operations. In some further examples, the standby circuits 140 may include circuitry in an I/O controller that controls input signals from a power button. For example, the standby circuits 140 may include some circuits that receive standby power and store data related to errors and/or diagnostic information. Power to such standby circuits is not typically affected by a normal re-boot operation in which power to main circuits is temporarily disabled. As such, errors or hang-ups that relate to the state of the standby circuits 140 may not be cleared by a typical re-boot operation.

The main circuits 145 may include some or all of the central processor unit(s) (CPU), memory, and/or disk drivers, for example, along with various memories, chip sets, and associated support circuitry.

The power supply 135 separately supplies standby power for standby circuits 140 and main power for the main circuits 145. During a re-boot, the supply of standby power to the standby circuits 140 may be maintained, but the supply of main power to the main circuits 145 may be disabled.

In some embodiments, the processor board 130 responds to a PCR message by sending control signal to the PCM 125 to cause the PCM 125 to cycle power to the standby circuits 140. In some embodiments, the processor board 130 responds to a PCR message by sending a control signal to the PCM 125 to cause the PCM 125 to cycle power to both the standby circuits 140 and the main circuits 145.

FIG. 1B shows details of an embodiment of the target device 115 according to an example implementation. In the depicted example, the processor board 130 receives both main power and standby power from the power supply 135 via the PCM 125. The PCM 125 is configured to control power supplied to the processor board 130 in response to PCR messages transmitted from the remote user terminal 105 via the network 110.

The remote user terminal 105 may be operated, for example, by a network administrator to remotely power cycle the target device 115. The administrator may input a remote power cycle command to cause the remote terminal 105 to send a PCR message via the network 110. The network 110, which may be, for example, a wired or wireless local area network (LAN), a wide area network (WAN), or a combination of such networks (e.g., the Internet), transports the PCR message to a network interface 120 of the target device 115. Once received, the contents of the PCR message may be sent from the network interface 120 to the PCM 125 and/or to the processor board 130. In other embodiments, the PCR message may be sent directly to the PCM 125 or to the processor board 130. For example, some or all of the PCR message can be processed and decoded on the processor board 130, and then forwarded to the PCM 125.

In some embodiments, the PCR message may be transmitted in a data packet that is wrapped with one or more packet headers. The PCR message may be encrypted and/or may include error correction/detection features (e.g., error correction code (ECC), cyclic redundancy check (CRC)). In various implementations, the target device 115 may strip packet and/or header information to recover the PCR message in the PCM 125, on the processor board 130, and/or in other components, such as the network interface 120.

In response to the PCR message, the PCM 125 may disable the processor board 130 by disabling power to both the standby circuits 140 and the main circuits 145.

In the depicted example, the standby circuits 140 and the main circuits 145 are powered by separate power sources from the power supply 135. The power supply 135 includes a +5VSB power supply 150 and a main power supply 155.

The +5VSB power supply 150 provides standby power to operate the standby circuits 140 under control of the PCM 125. The PCM 125 may control the standby power supplied to the standby circuits 140 by connecting a power signal line of the standby power to a switch. The controlled standby power is coupled to the standby circuits 140 through a +5VSB_SW power supply 160 of the PCM 125. In this example, the PCM 125 may disable and enable the operation of the standby circuits 140 using the +5VSB_SW power supply 160. For example, the PCM 125 may cycle power to the standby circuits 140 by disabling the +5VSB_SW power supply 160 to disconnect power to the standby circuits 140, and by subsequently re-enabling the +5VSB_SW power supply 160 to re-activate operation of the standby circuits 140.

The main power supply 155 provides main power to operate the main circuits 145. In the depicted example, one or more main power signals pass through the PCM 125. In alternative embodiments, one or more main power signals may be directly connected to the processor board 130 and/or other devices (e.g., storage devices) without passing through the PCM 125. In some embodiments, the main power supply 155 may provide more than one power signal. By way of example and without limitation, the main power supply 155 may include any or all of a +3.3VDC power signal, a +5VDC power signal, a −5VDC power signal, a +12VDC power signal, and a −12VDC power signal. One or more corresponding ground reference or return conductors may be provided as needed.

The power supply 135 includes a PS_ON input 165 that controls the operations of the main power supply 155. For example, the power supply 135 may disable the main power supply 155 when an appropriate signal is received at the PS_ON input 165. Additionally, the power supply 135 may be configured to enable the main power supply 155 only when the PS_ON input 165 is receiving a voltage high signal. When the PS_ON input 165 is receiving a voltage low signal or an open circuited signal, the power supply 135 may disable the main power supply 155.

In the depicted example, the PS_ON output signal is coupled from the processor board 130 to a PS_ON_IN input on the PCM 125. The PS_ON input 165 of the power supply 135 is coupled to a PS_ON_OUT output of the PCM 125. In some embodiments, the PCM 125 may generate a PS_ON signal and the PCM 125 may also route the PS_ON signal generated from the processor board 130. For example, the PCM 125 may include a switch that connects the PS_ON signal generated from the processor board 130 to the power supply 135. During normal operation, the switch may be closed to route the generated PS_ON signal to the power supply 130. In other operating modes, which may occur when the PCM 125 receives a PCR message from the remote user terminal 105, the PCM 125 may operate the switch to generate and transmit a PS_ON signal to the power supply 135 to disable the main power.

The administrator may operate the PCM 125 to power cycle the target device 115 locally or remotely. Locally, the administrator may power cycle the target device 115 by pressing a switch 170. The switch 170 is connected to the PCM 125. In some embodiments, the switch 170 may also be coupled to an input on the power supply 135. The power supply 135 may be configured to disable main power responsive to manipulation of the switch 170.

In an illustrative embodiment, the PCM 125 may be configured to re-boot the target device 115 (e.g., by disabling main power) if the switch 170 is pressed and held for about 3 seconds, and then released. In some embodiments, the PCM 125 may be configured to power cycle the target device 115 (e.g., by disabling main and standby power) if the switch 170 is held for at least 5 seconds. In another example, the target device 115 may be power cycled (e.g., by disabling main and standby power) if the switch 170 is pressed and released 3 times within 5 seconds. The PCM 125 may be configured to distinguish between re-boot and power cycle input commands according to other distinctive input sequences and timing parameters.

The administrator may also use the remote user terminal 105 to issue messages to cause a selected degree of power disabling in the target device 125. In one example, the PCR message may trigger the processor board 130 to generate a PS_ON signal to the power supply 135 to turn off only the main power supply 155 for a predefined duration of time (e.g., 3-10 seconds) to attempt to clear a hang-up in the main circuits 145. In another example, a different PCR message may trigger the PCM 125 to execute a power cycle operation to disconnect the +5VSB power supply 150 and to generate a PS_ON signal to disable the power supply 135. In this case, both the +5VSB power supply 150 and the main power supply 155 would stop supplying power to the processor board 130, causing the standby circuits 140 and the main circuits 145 to be turned off. Then, after a suitable delay period (e.g., 1-10 seconds), the PCM 125 may complete the power cycle operation by restoring power from both of the power supplies 150 and 155 to the processor board 130. In another embodiment, the PCR message may cause only the standby power to be cycled without disabling main power.

In some embodiments, some components of the target device 115, such as the PCM 125, and some function of the network interface 120, may remain operational when the target device 115 is turned off. For example, after disabling power to circuits 140, 145 by pressing the button 170, a remote client, such as the remote user terminal 105, can transmit a PCR message to be processed by the PCM 125 to re-enable the power supply circuits.

In an illustrative example of the system 100, the target device 115 may be a client coupled to a server area network. An administrator monitoring the target device 115 from the remote user terminal 105 may detect a loss of functionality, such as a system hang-up, by observing that the target device 115 is non-responsive.

For example, the target device 115 may be configured to send a status signal to the remote user terminal 105 at regular time intervals or upon receiving a request from the remote user terminal 105. The remote user terminal 105 may detect that the target device 115 is non-responsive when the target device 115 fails to send an expected status signal to the remote user terminal 105 or to another device (not shown) on the network 110. Upon determining that the target device 115 is non-responsive, the remote user terminal 105 (or other processor-based network device) may send an electronic message, such as an email message, to notify the administrator that the computer system 115 is hung-up. In one example, the administrator may send a PCR message through the network 110 to remotely power cycle the target device 115. The PCR message may cause the PCM 125 to power cycle both the standby circuits 140 and the main circuits 145 by disabling and then re-enabling the circuits 140 and 145. In another example, the PCR message may be automatically generated and sent.

Figure 2:
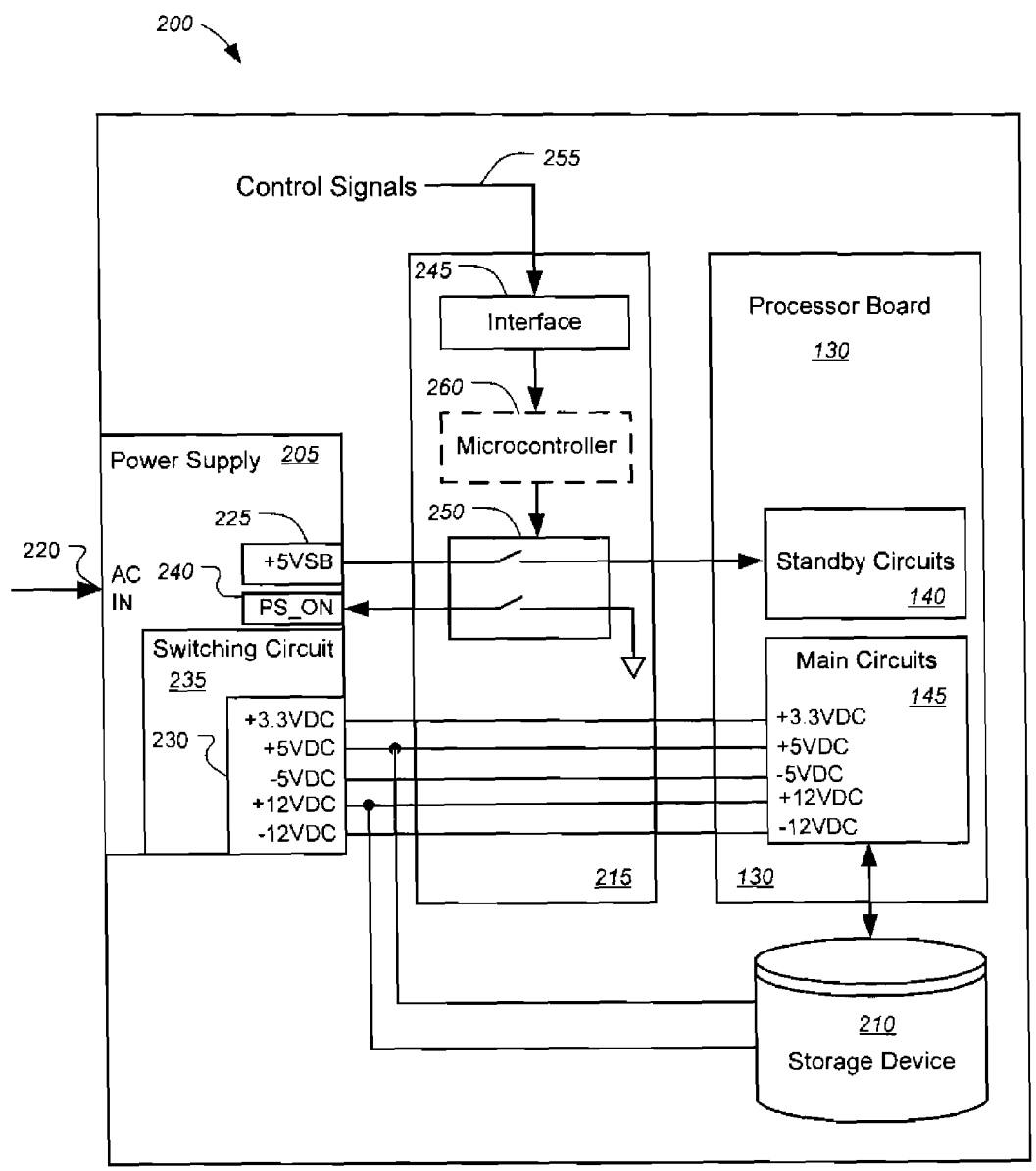
FIG. 2 is a block diagram showing a system with a power cycle module.

FIG. 2 is a block diagram showing a system with a power cycle module. FIG. 2 includes an exemplary computer device 200 that may be included in a server, a desktop computer, a laptop computer, a handheld computer, or other processor-based device, such as a wireless router. In this example, the computer device 200 includes a power supply 205 that supplies electrical power to the processor board 130 and a data storage device 210. The computer device 200 also includes a PCM 215 coupled to the power signal lines between the power supply 205 and the processor board 130. The PCM 215 allows circuitry on the processing board 130, including circuitry powered by standby power, to be remotely power cycled in response to a control signal, such as the PCR message sent from the remote user terminal 105 (FIGS. 1A, 1B).

The power supply 205 includes an AC IN terminal 220, a +5VSB power supply 225, and a main power supply 230. The power supply 205 includes a switching circuit 235 to enable or disable the main power supply 230 in response to a signal at a PS_ON input 240.

In an exemplary embodiment, the power supply and associated wiring harnesses and connectors may be compatible with or adapted from industry standards specifications, such as a version of the Advanced Technology Extended (ATX) specification.

In the depicted example, the +5VSB power supply 225 is a standby power output that is active whenever suitable AC power is present at the AC IN terminal 220. The +5VSB power supply 225 supplies power to the standby circuits 140 in the computer device 200. The main power supply 230 supplies one or more voltage signals. The main power supply 230 supplies +3.3VDC power signal, a +5VDC power signal, a −5VDC power signal, a +12VDC power signal, and a −12VDC power signal. The storage device 210 receives power from the +5VDC power signal and the +12VDC power signal.

The PS_ON input 240 receives control signals for operating the switching circuit 235. In the depicted example, the PS_ON signal is an active-low signal.

For example, when the PS_ON input 240 is pulled low, the switching circuit 235 activates the main power supply 230. When PS_ON input is pulled high or open-circuited, the switching circuit 235 disables the main power supply 230. When the main power supply 230 is disabled, the power supply 205 is not operating to supply main power to components such as the main circuits 145 and the storage device 210. However, the power supply 205 may continue to supply standby power to other components, such as the standby circuits 140.

The PCM 215 includes an interface 245 and a switch module 250. The interface 245 may receive control signals 255 that trigger a power cycle operation.

In various embodiments, power cycle operations may be triggered by receipt of a PCR message from an Ethernet port coupled to a web server. In some examples, PCR messages may be transmitted in valid or invalid Ethernet frames. Invalid Ethernet frames may include out-of-band (OOB) signals. The network interface 120 (FIG. 1) may be responsive to messages transmitted as OOB signals, and may route the PCR message transmitted in the OOB channel to the PCM 215 for decoding. In other examples, the processor board 130 may interpret PCR messages transmitted as OOB signals, and may send the appropriate power cycle instruction to the PCM 215.

In other embodiments, a triggering signal may include a PCR message sent through a standard serial or parallel port, through a modem, through a SMBus or I2C Bus, through a 1-wire serial connection, or through an optical (e.g., IR) or wireless (e.g., RF) data channel. In some embodiments, the triggering signal may be initiated by a timer or by the time of day.

Absence of an expected signal may also be used to trigger a power cycle operation. For example, the PCM 125 may monitor for a status_good signal that is expected to be received at a minimum rate (e.g., once per second, once every ten seconds, once per hour, once per day, etc.). The processor board 130 may generate status_good signals after performing status or health checks on standby-powered devices, for example. If the time between receipt of status_good signals exceeds a threshold time, then operations to perform a power cycle may be initiated.

A user of the target device may make an input to trigger a power cycle operation, for example, by command line entry, clicking with a mouse to execute a software program, or by selecting a user input control (e.g., radio button) on a graphical user interface (e.g., browser window) from within an application program.

Trigger signals may also be generated, for example, when more than a predetermined number of rings occur on a phone line (e.g., host does not answer), when a network carrier is not available (e.g., indicating the network is down), or when the network becomes available after a period of interrupted service. The signal may be generated based on timers, counters, and/or according to a selected schedule. Triggering signals may be generated internally or externally with respect to the PCM 125, and may be transmitted to the PCM 125 over wired and/or wireless interfaces.

In other embodiments, power cycle operations may be triggered by a combination of two or more of the above-described trigger events.

In the depicted example, power signal lines from the main power supply 230 may pass through the PCM 215 directly. The switch module 250 is connected to a power signal line from the +5VSB power supply 225 and a control signal line for the PS_ON input 240. The switching module 250 may perform power cycle operation for the computer device 200 when the PCM 215 receives the control signal 255. In some embodiments, the switching module 250 may power cycle the computer device 200 by manipulating (e.g., connecting to circuit ground) the PS_ON input 240, and by disconnecting (e.g., open-circuiting) and subsequently reconnecting the +5VSB power signal line. In response to the manipulation of the PS_ON input 240, the switching circuit 235 disables or enables the main power supply 230. The disconnection and reconnection of the +5VSB power signal line controls the supply of standby power to standby-powered circuits.

In the depicted example, the PCM 215 includes a microcontroller 260 to provide additional functionalities to the PCM 215. In one embodiment, the microcontroller 260 may be configured to poll components in the computer 200 to detect events or conditions that should trigger a power cycle operation.

In an illustrative example, the microcontroller 260 may perform operations that include receiving and processing a signal that contains a message. Instructions stored in a memory on the PCM 5 or elsewhere in the computer device 200 (e.g., on the processor board 130, the storage device 210, etc.) may cause the microcontroller 260 or other processor device to perform operations that include determining if the received signal includes a PCR message. In various examples, the PCR message may include a disable request and/or a re-enable request. Upon determining that the received signal contains a PCR message, the microcontroller 260 may perform operations to disconnect a current path between +5V_SB 225 and the standby circuits 140. If the PCR includes a re-enable request, then the microcontroller 260 may perform operations to re-connect the current path between +5V_SB 225 and the standby circuits 140. The operations to disconnect or to re-connect the current path may include sending control signals, for example, to operate the switch module 250 to open or close a series-connected relay, switch, or semiconductor channel (e.g., MOSFET, JFET, BJT, IGBT) in the path.

As an illustrative example, the computer device 200 may include a modem (not shown) that is powered by standby power and configured to answer incoming calls on a telephone line. The microprocessor 260 may monitor the number of phone rings received at the modem. If the modem fails to answer after more than a threshold number of rings, then the microprocessor 260 may trigger a power cycle operation to restore functionality of the modem.

In various embodiments, the microcontroller 260 may execute instructions to operate the switch module 250 to disconnect either or both of the +5VSB power signal line and the PS_ON control signal line. In some embodiments, the microcontroller 260 may detect status of the +5VSB power signal line or the PS_ON control signal line and report the status to the remote user terminal 105 via the network interface 120 (FIG. 1). In yet another embodiment, the microprocessor 260 may include an internal clock that may be configured to power cycle the computer device 200 on a recurring basis, such as according to a predetermined maintenance schedule.

For example, the PCM 215 may receive instructions that can be stored and/or executed by the microcontroller 260 to power cycle the computer device 200, for example, weekly. In another example, the PCM 215 may include a timer logic circuit (not shown) that automatically power cycles the computer device 200 when the computer device 200 operates continuously for a period of time, such as ten hours, for example.

In some embodiments, the PCM 215 can receive software updates via the interface 245 or via communication with the processor board 130. In one example, the PCM 215 can download updates from the network 110 through the interface 245. In another example, the processor board 130 may receive updates from a CD-ROM, a USB thumb drive, or other portable storage device, and then transmit the received updates to the PCM 215.

In some embodiments, other power lines may also be switched to provide additional power cycle control capabilities. For example, the switch module 250 may be configured to independently control both the +5VDC power supply and the −5VDC power supply. In this particular embodiment, the remote user terminal 105 may, either sequentially or simultaneously, remotely cycle power supplied by the +5VDC power and the −5VDC power signals.

The PCM 215 may be powered by the power supply 205, or by separate power inputs. In one embodiment, the PCM 215 may be powered by the +5VSB power supply 225. When the PCM 215 is performing the power cycle operation and the +5VSB is disconnected from the processor board 130, in some implementations, the PCM 215 may continue to receive power from the +5VSB power supply 225. In other embodiments, the PCM 215 may receive power from one or more batteries or battery packs in parallel and/or series combinations. The PCM 215 may then disable power to both main circuits and standby circuits in the computer device 200. In other embodiments, other power sources can supply power to the PCM 215.

Figure 3:
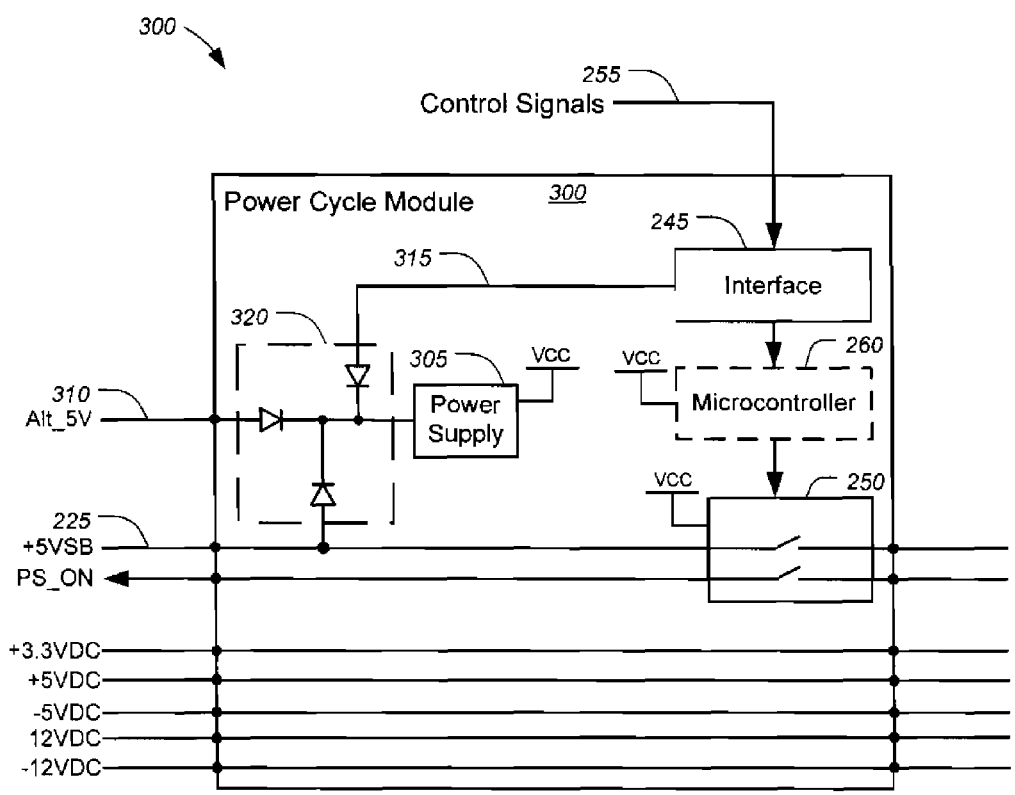
FIG. 3 is a schematic diagram showing an example power cycle module configured to receive operating power from any of a number of sources.

FIG. 3 is a schematic diagram showing an example power cycle module PCM 300 configured to receive operating power from a number of power sources. In an illustrative embodiment, the PCM 300 may be used in the system 200 (FIG. 2) as the PCM 215. The PCM 300 includes the interface 245, the microcontroller 260, the switch module 250, and a power supply module 305.

In this example, the power supply module 305 is configured to draw power from the +5VSB power supply 225, from an alt_5V power supply 310, and/or from the interface 245. As such, the PCM 300 may operate independent of the operating state of the power supply 205.

In the depicted example, the PCM 300 includes an exemplary power combiner circuit 320 configured as a diode-OR structure to combine the three power sources 225, 245, 310 to the power supply module 305. Using the power combiner circuit 320, more than one power source can be combined to provide power to the PCM 300. For example, if the +5VSB power supply 225 fails to regulate properly, the PCM 300 can automatically switch to draw operating power from any of the other power sources 310, 315. In other embodiments, additional power sources, such as an external battery, may be provided and combined. The combination of power sources provides redundant power capability and improved reliability of the PCM 300.

In the depicted example, the PCM 300 may receive power through the interface 245. In some implementations, the interface 245 may be configured to draw power from control signals. For example, the interface 245 may transform signals received from an RS-232 or USB communication link into an electrical power signal 315 to support operations in the PCM 300. Some embodiments may store energy from one or more power sources in a storage element, such as a capacitor or a battery (e.g., with a battery charger circuit). Stored energy may be used to supply operating power during a power cycle operation, for example.

In some embodiments, other circuits may be used to combine power from multiple sources. For example, junction gate field-effect transistors (JFETs), metal oxide semiconductor field-effect transistors (MOSFETs), Insulated Gate Bipolar Transistors (IGBTs), or other semiconductor or mechanical switches (e.g., mechanical relay) may be used to controllably combine power in the power combiner circuit 320.

Figure 4:
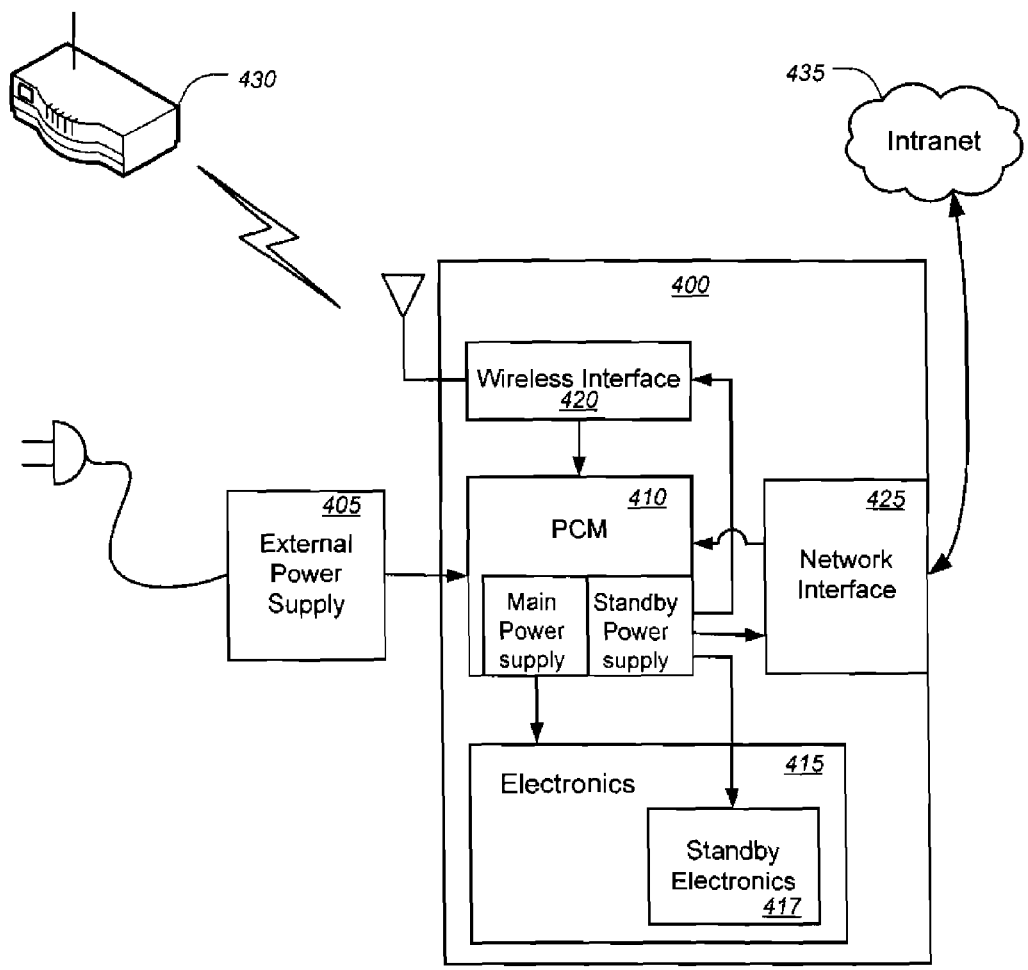
FIG. 4 is a block diagram showing an example system with wireless communication capability for communicating messages with a power cycle module.

FIG. 4 is a block diagram showing an example system with wireless communication capability for communicating messages with a power cycle module. The depicted example system includes an exemplary processing device 400 that has an external power supply 405. The processing device 400 may be, for example, a server, a programmable controller, a laptop computer, a wireless router, or other computer system. The power supply 405 is connected to a PCM 410. The PCM 410 may transmit the received power to electronics circuits 415 of the device 400. The electronic circuits 415 may be used to provide functionalities of the processing device 400. For example, the electronic circuits 415 may include the communication processing circuit of a wireless router. The electronic circuit 415 includes standby-powered electronic circuits 417 that operate from standby power supplied by the PCM 410.

The PCM 410 includes a wireless interface 420 and a network interface 425, each of which may receive PCR messages. Both interfaces 420, 425 are powered by standby power.

In the depicted example, the wireless interface 420 connects the processing device 400 to a wireless network, such as a wireless LAN network, mobile communication network, or other wireless communication network via a wireless router 430. PCR messages may be remotely generated and transmitted to the processing device 400 through the wireless router 430.

The network interface 425 connects the processing device 400 to an intranet 435. The processing device 400 may receive power cycle instructions or PCR messages that are initiated from other processing devices connected to the intranet 435. For example, there may be an administrative processor on the intranet 435 that monitors operating conditions of the processing device 400. If the administrative processor detects that the processing device 400 fails to operate properly, then the administrative processor may send a power cycle request to the processing device 400 to restore functionality by power cycling all components in the processor device 400, including the standby electronic circuits 417 and the interfaces 420, 425.

The PCM 410 is configured to power cycle the processing device 400 by disconnecting and reconnecting the power supply 405 and other components 415, 417, 420, 425 in the processing device 400. The power supply 405 may provide one or more voltages. In one implementation, the PCM 410 may switch all the voltages from the power supply 405. The PCM 410 may disable all the provided output voltages from the power supply 405 during a power cycle operation. In another implementation, the PCM 410 may disable (e.g., by creating an open circuit with a series-connected switch) the return (e.g., ground or common) power line in addition to or instead of the voltage rail. When the ground/return line is open circuited, one or more corresponding other power lines may not need to be switched. In some cases, such an implementation may reduce manufacturing costs.

Figure 5:
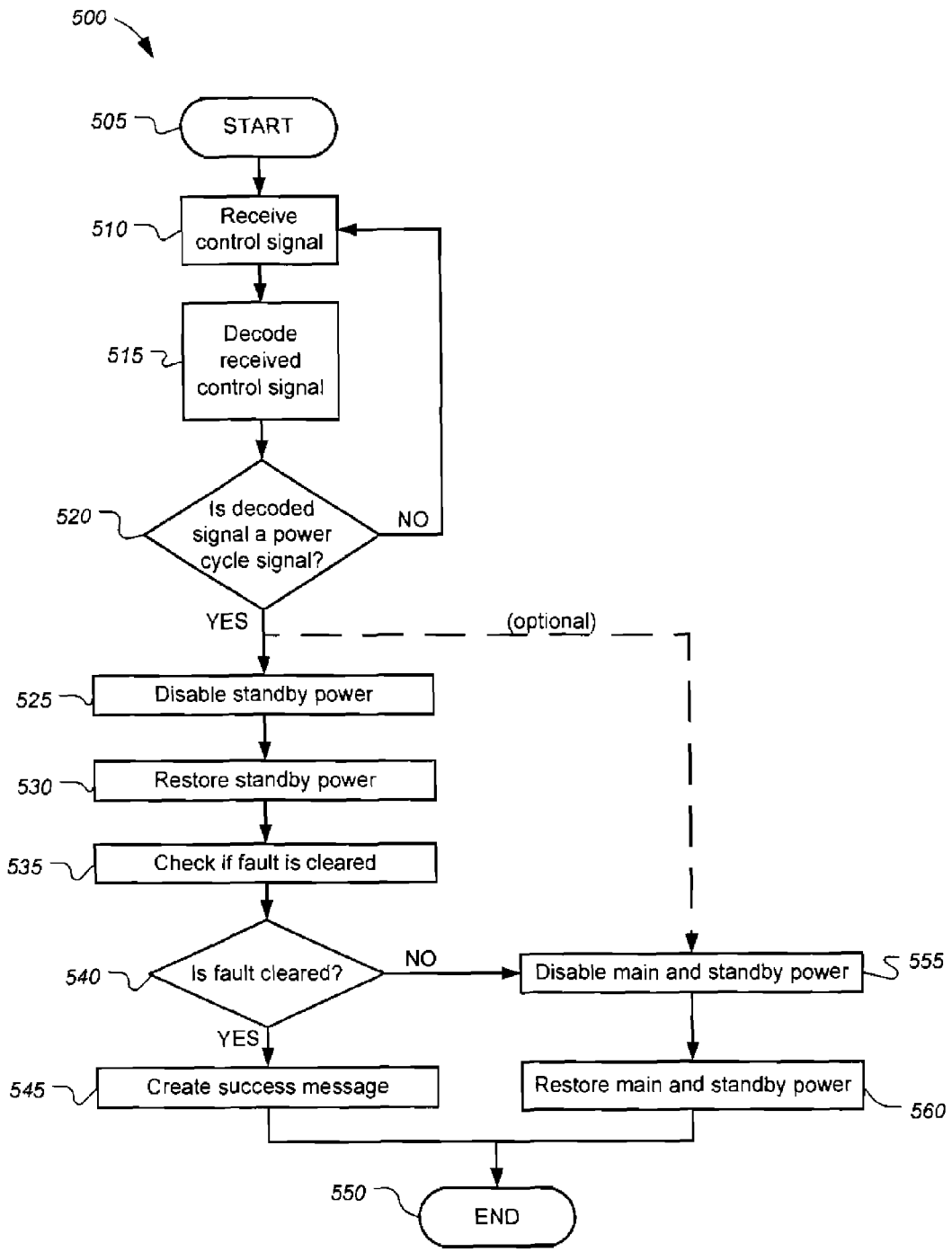
FIG. 5 is a flow diagram illustrating a method to power cycle a computer system.

FIG. 5 is a flow diagram illustrating a method to power cycle a computer system. A flowchart 500 illustrates an example set of operations that the PCM 125 may perform. In some embodiments, the operations may be performed under the control, supervision, and/or monitoring of the processor board 130, the control logic in the PCM 125, and/or the microcontroller 260. Operations may also be supplemented or augmented by other processing and/or control elements that may be incorporated by the interface 245. Some or all of the operations may be performed by one or more processors executing instructions tangibly embodied in a signal. The processing may be implemented using analog and/or digital hardware or techniques, either alone or in cooperation with one or more processors executing instructions. The PCM 125 may perform the illustrated operations to receive and identify control signals, such as PCR messages, and to power cycle processing devices in accordance with examples that are described with reference to FIGS. 1A, 1B, and 2-4.

In the flowchart 500, the method begins at step 505 when the PCM 125 is initialized and waiting for a control signal. For example, the method may begin when the target device 115 (FIG. 1B) is powered up. As another example, the method may begin when a user activates the PCM 125 by physically pressing a start button (e.g., switch 170) or by making an input to cause a PCR message to be sent to the PCM 125.

The PCM 125 receives a control signal in step 510. For example, the PCM 125 may receive a control signal from the network 110 as an OOB signal. In another example, the PCM 125 may not receive a status_good signal from the processor board 130 within a predetermined time frame. In step 515, the PCM 125 decodes the received control signal. For example, the PCM 125 may unwrap the packet of the received packet and interpret the received control signal according to an instruction table stored in a non-volatile memory. Then, the PCM 125 determines, in step 520, whether the decoded signal is a PCR signal. If the PCM 125 determines that the decoded signal is not a PCR signal, then the PCM 125 repeats step 510. If the decoded signal is a PCR signal, then, in step 525, the PCM 125 disables standby power, for example, by operating the switch module 250 to disconnect standby power from standby-powered circuits.

In one embodiment, standby power is restored at step 530. Power may be restored, for example, after a delay of about several seconds, or sufficient time for power supply voltages to fall to a sufficiently low levels so that memory locations or registers that may be causing the hang-up condition will be reset. After power has been restored for a sufficient time such that standby-powered devices will have resumed operation, the PCM 125 checks at step 540 whether the fault associated with the hang-up condition has been cleared. If the fault has been cleared, then a success message is generated at step 545. The success message may contain information about the nature of the hang-up, time stamp, and operating condition information (e.g., current hardware or software version information). The success message and/or hang-up related information may be transmitted to the processor board 130 or to the remote terminal 105, and/or stored in a status log in a non-volatile memory for later analysis. After step 545, the method ends at step 550.

If, at step 540, the fault associated with the hang-up condition has not been cleared, then both main and standby power are disabled at step 555. Main power may be disabled, for example, by operating the switching module 250 to manipulate the PS_ON signal to cause the switching circuit 235 to disable the main power supply 230. After an appropriate delay, main and standby power are restored at step 560, and the method ends at step 550.

In an alternative embodiment, step 520 may be followed by the operations described in steps 555, 560 if the decoded signal is a PCR signal.

As an example of a power cycle operation, the PCM 125 may first disable the processor board and other component in the system, including components powered by standby power, by disconnecting the standby power supply and sending a power disable signal to the power supply 135. For example, the PCM 125 may disconnect standby power by disconnecting the +5VSB power supply 150 and sending a disable power signal to the power supply 135 (e.g., a high signal to the active-low PS_ON input 165). The PCM 125 may then restore power to the system by reconnecting the standby power supply and sending a enable power signal to the power supply 135.

In some embodiments, the PCM 125 may be implemented on a stand-alone module. In other embodiments, the PCM 125 functionality may be integrated into a printed circuit board with the motherboard, the power supply, a peripheral device (e.g., NIC), or a combination thereof. Some or all of the PCM 125 circuitry may be incorporated into a wire harness or a flex circuit.

In various embodiments, the PCM 125 may disable main power by generating a logic level signal to the power supply or the motherboard. Such a logic level signal may drive a disable signal, such as an off-state of PS_ON, an over-voltage shut-down signal, over-current signal, thermal limit input, or other input that can effectively cause a controller of the power supply to interrupt power being supplied to the main output terminal of the power supply. In some further embodiments, the PCM may disable main power by opening a series switch (or parallel combination of switches) through which main power flows to the main circuits.

In some embodiments, the main power may be maintained, or it may be disabled substantially before, substantially concurrently, or substantially after standby power is disabled. Various predetermined delays may be incorporated to controllably disable and/or re-enable power to standby power and main power, for example, according to corresponding time offsets or delays.

In some embodiments, the standby power may operate responsive to a command to controllably disable a supply of standby power being supplied to any one or more of a number of selected circuits and/or devices powered by standby power. The PCM 125 may include any practical number of switches to independently control standby power to circuits that are supplied standby power through independent circuit paths. In such implementations, standby power to standby-powered circuits may be selectively and/or sequentially disabled to attempt to clear the hang-up without power cycling all standby circuits or the main circuits. For example, standby power to a video graphics card may be disabled without disabling standby power to other standby-powered circuits. If disabling power to the video graphics card does not clear the hang-up, then standby power may be disabled to another standby power circuit, such as a network interface card, for example. If selectively disabling power to specific circuits does not clear the hang-up condition, then a full power cycle of the entire computer system may be performed.

In various embodiments, user interfaces may include at least one input device, such as a keyboard, touch screen, keypad, or computer mouse, and may include a microphone, camera, scanner, or other device for sound or image recognition.

A number of embodiments have been described. Nevertheless, it will be understood that various modifications may be made without departing from the spirit and scope of the described embodiments. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A power control system, comprising:
   a switch having a first terminal to connect to a standby DC power source in a computer, and having a second terminal to connect to standby circuits of the computer; and
   a controller communicating with an input device external to the computer, and operatively connected to the switch to decouple the first terminal from the second terminal in response to a power cycle signal from the input device to disable power supplied to the standby circuits while power remains supplied to main circuits of the computer, the power cycle signal being generated in response to a detected condition of the computer.

2. The system of claim 1, wherein the controller comprises a processor.

3. The system of claim 1, wherein the switch comprises a transistor.

4. The system of claim 1, further comprising a pass-through connection for at least one voltage from at least one power source other than a first standby power source for the computer.

5. The system of claim 4, further comprising a control output port operable to connect to the at least one power source other than the first standby power source and to cause the connected power source to shut down in response to the power cycle signal.

6. The system of claim 1, wherein the input device generates the power cycle signal in response to user input.

7. The system of claim 6, wherein the input device comprises an input switch.

8. The system of claim 6, wherein the input device comprises a user interface.

9. The system of claim 8, wherein the user interface comprises at least one member selected from the group consisting of a keyboard, touch screen, keypad, or computer mouse.

10. The system of claim 1, further comprising a data routing component powered by standby power and performing data routing operations.

11. The system of claim 1, further comprising a server component powered by standby power and performing server operations when in communication with at least one client device.

12. The system of claim 1, wherein the power cycle signal is transmitted as an Ethernet signal.

13. The system of claim 1, wherein the power cycle signal is transmitted as an out-of-band signal.

14. The system of claim 13, wherein the power cycle signal further comprises a signal associated with an invalid Ethernet frame.

15. The system of claim 1, wherein the power cycle signal comprises a signal indicative of the absence of a signal within a predetermined period of time.

16. The system of claim 1, wherein the power cycle request comprises a signal generated at a preselected time.

17. A method to power cycle a device, the method comprising:
    receiving a signal to cycle power in a device having a main DC voltage supply and a standby DC voltage supply, disabling the main DC voltage supply, and not disabling the standby DC voltage supply during a re-boot operation, the signal being generated in response to a detected condition of the device; and
    decoupling an output of the standby DC voltage supply from a standby circuit in the device in response to the received signal to disable the standby DC voltage supply while maintaining the main DC voltage supply.

18. The method of claim 17, wherein decoupling the output of the standby DC voltage supply from the standby circuit comprises modulating the conductivity of a semiconductor switch.

19. The method of claim 17, further comprising re-coupling the output of the standby DC voltage supply to the standby circuit in response to a re-enable signal.

20. The method of claim 19, wherein the re-enable signal is received at a communication port of the device.

21. The method of claim 19, further comprising generating the re-enable signal at least a preselected period of time after decoupling the output of the standby DC voltage supply from the standby circuit.

22. The method of claim 17, wherein the signal is received in response to manipulation of a user interface on the device.

23. An apparatus to control power in a computing device, comprising:
    a first circuit to couple a first DC voltage source for the computing device to a voltage supply node of a first circuit of the computing device, the first DC voltage source being disabled from supplying power during a re-boot operation of the computer device;
    a second circuit to couple a second DC voltage source for the computing device to a voltage supply node of a second circuit of the computing device, wherein the second DC voltage source is operable to supply power during a re-boot operation of the computing device; and means for decoupling the second DC voltage source from the second circuit voltage supply node in response to a power cycle request while the first DC voltage source supplies power to the first circuit, the power cycle request being generated in response to a detected condition of the computer device.

24. The apparatus of claim 23, wherein the power cycle request comprises a message received over an electronic communication channel.

25. The apparatus of claim 23, wherein the power cycle request comprises a signal indicative of the operational status of a network to which the computing device is operatively coupled.

26. The apparatus of claim 23, wherein the means for decoupling is supplied with operating power through a means for combining power from a plurality of power supplies.

27. The apparatus of claim 23, wherein the first DC voltage source is a main voltage source, and the second DC voltage source is a standby voltage source.

* * * * *